July 4, 1933.  T. G. WRIGHT  1,916,748
PROCESS AND APPARATUS FOR APPLYING EDGE SEALING MATERIAL TO LAMINATED GLASS
Filed Feb. 11, 1932
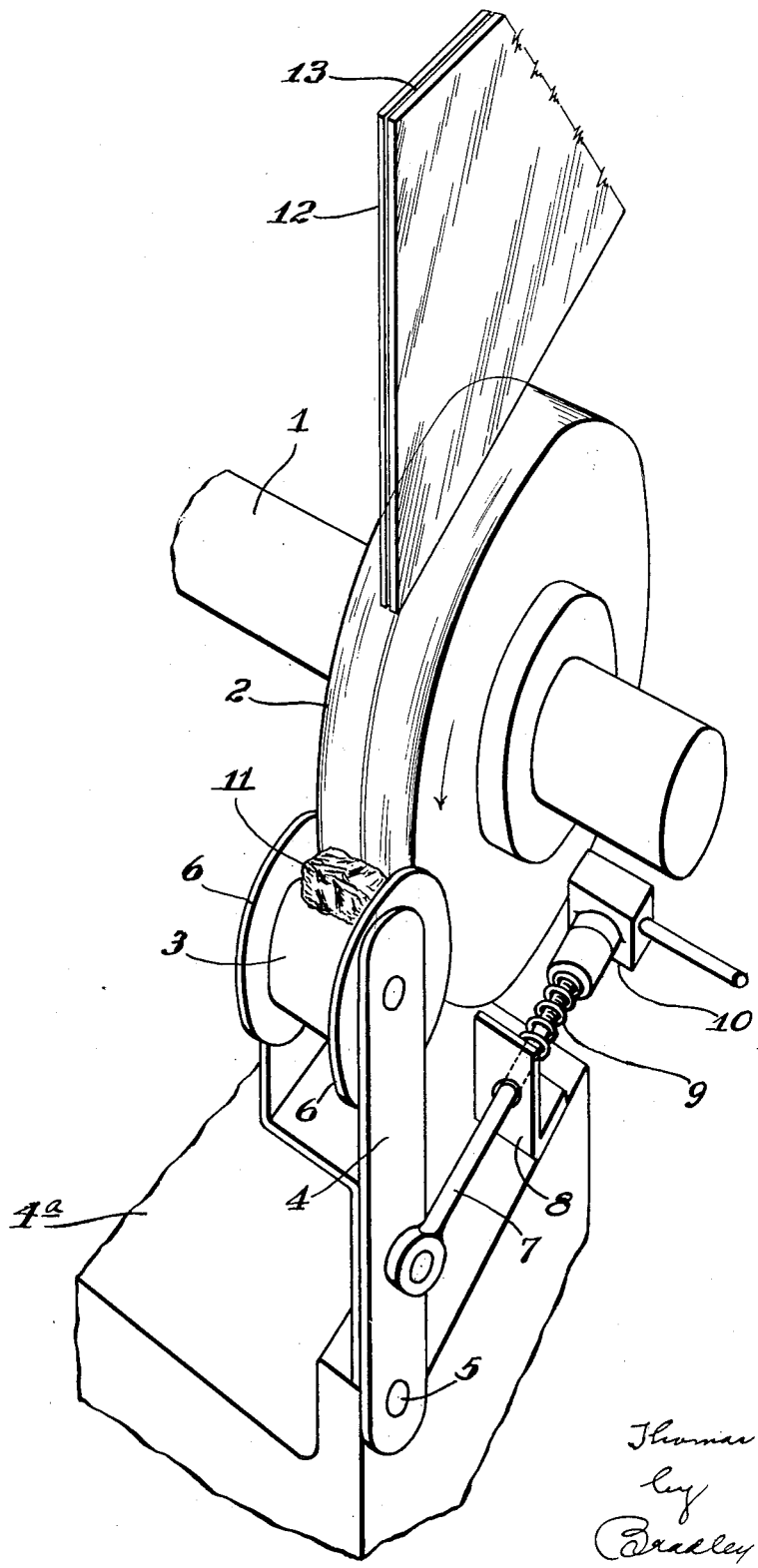
INVENTOR
Thomas G. Wright
by
Bradley + Bee attys.

Patented July 4, 1933

1,916,748

UNITED STATES PATENT OFFICE

THOMAS G. WRIGHT, OF TARENTUM, PENNSYLVANIA, ASSIGNOR TO DUPLATE CORPORATION, A CORPORATION OF DELAWARE

PROCESS AND APPARATUS FOR APPLYING EDGE SEALING MATERIAL TO LAMINATED GLASS

Application filed February 11, 1932. Serial No. 592,291.

The invention relates to a process and apparatus for applying sealing material to laminated glass plates. Such plates consist ordinarily of two sheets of glass cemented to the opposite sides of a sheet of reinforcing material, such as celluloid. In order to protect the edges of the plate against edge separation and to the entrance of moisture, it is the practice to groove out the celluloid by a cutting tool or by the use of acid, to a depth of about one sixteenth of an inch, such groove then being filled with a more or less plastic sealing material, such as pitch, which may or may not subsequently harden, depending on the particular material used. The object of the present invention is to provide an improved process and apparatus for filling the groove at the edges of the sheet with the caulking or sealing material quickly with a minimum of labor and without waste of caulking material. One embodiment of the invention is illustrated in the accompanying drawing, wherein:

The figure is a perspective view showing the apparatus and its method of use.

Referring to the drawing, 1 is the axle of the device mounted in suitable bearings (not shown) and driven continuously by any suitable means. Mounted on the shaft is the disc 2 of yielding fibrous material, preferably felt, which is capable of absorbing and holding to a certain degree the caulking paste employed in the operation. Lying at one side of the disc is a metal roller 3 mounted for rotation in the bracket 4, such bracket itself being pivoted at 5 to the bench 4a on which the device is mounted. The roller is provided with a pair of flanges 6, 6 which overlap the sides of the disc 2, and the bracket is pulled yieldingly toward the disc by means of the arm 7 passing through a bracket 8 and carrying on the far side of such bracket a spiral spring 9. The arm 7 is threaded and carries the nut 10 engaging the outer end of the spring so that the degree of tension of the spring may be adjusted by rotating the nut. The recess between the periphery of the disc and the roller is filled with the caulking material 11 which may be of any composition, the requirement being that it shall be in the form of a plastic paste which will stick to the periphery of the disc and penetrate to a certain extent and will constitute a satisfactory seal against moisture. The rotation of the felt disc 2 in the direction indicated by the arrow tends to feed the paste between the roller and the disc and the amount of this feed may be reguated by adjusting the nut 10. The supply of paste is renewed from time to time as it becomes exhausted due to the use of the apparatus.

In using the apparatus, the laminated plate 12 having in its edge the groove 13 to be sealed or caulked is held against the disc by the operator, as indicated in the figure. The plate is pressed against the disc sufficiently to cause the paste to penetrate the groove and fill it at the point of contact between the plate and the disc, and the operator moves the plate gradually along the wheel until the groove at one edge of the plate is filled from end to end, after which the succeeding edges are similarly treated. The paste may be applied to fill the groove rapidly and positively and the loss of material is relatively slight, the spring 9 being adjusted so that the feed of caulking material is just sufficient to keep the periphery of the disk properly coated. The flanges 6 on the roller 3 not only serve to prevent a loss of caulking material laterally from the recess in which it lies, but also serve to keep the layer of caulking material on the periphery of the disc from spreading laterally over the sides of the disc. The sides of the disc are kept clean in this manner and the caulking material is prevented from being thrown from the disc.

The fibrous character of the wheel is important in order to avoid chipping the glass such as might occur with a metal wheel and in order to secure an adhesion of a layer of paste to the surface of the wheel. Any fibrous material will meet the requirement which has the necessary wearing qualities and which will not chip the glass, although felt is preferred because of its capacity for picking up and holding a layer of the calking material.

What I claim is:

1. A process of applying plastic calking paste to the grooved edge of a plate of laminated glass, which consists in dragging a cylindrical rotating surface through a mass of the paste held against bodily movement, so that a layer of the paste is spread over the surface, and progressively engaging the grooved edge of the plate with such surface with the plate held in a plane substantially parallel to the plane of rotation of the cylindrical surface.

2. A process of applying a sealing material to the grooved edge of a plate of laminated glass which consists in applying the sealing material in the form of a plastic paste upon a cylindrical surface, rotating such surface and progressively engaging the grooved edge of the glass with such surface.

3. An apparatus for applying a calking paste to the grooved edge of a plate of laminated glass, comprising a disc having a horizontal axis of rotation, a roller engaging the periphery of the disc at one side thereof to provide a pocket for a calking material between its surface and that of the disc and provided at its ends with flanges which overlap the side faces of the disc, and means for rotating the disc so that the edge next to the roller moves downward.

4. An apparatus for applying a calking paste to the grooved edge of a plate of laminated glass, comprising a disc having a horizontal axis of rotation, an idler roller at one side of the disc in opposition to its periphery to provide a pocket for the calking paste between the surface of the disc and the roller, yielding means for pressing the roller against the disc, means at the ends of the roller overlapping the sides of the disc for preventing the escape of paste at said ends, and means for rotating the disc so that the edge next to the roller moves downward.

5. An apparatus for applying a calking paste to the grooved edge of a plate of laminated glass, comprising a disc having a horizontal axis of rotation, a roller at the edge of the disc having flanges overlapping the sides of the disc so that a pocket for the calking paste is provided between the roller and the disc, means for regulating the relative position of the disc and roller, and means for rotating the disc so that its edge next to the roller moves downward.

In testimony whereof, I have hereunto subscribed my name this 6th day of February, 1932.

THOMAS G. WRIGHT.